US012275910B2

United States Patent
Kojima et al.

(10) Patent No.: US 12,275,910 B2
(45) Date of Patent: Apr. 15, 2025

(54) LUBRICATING OIL COMPOSITION

(71) Applicant: IDEMITSU KOSAN CO., LTD., Chiyoda-ku (JP)

(72) Inventors: Akio Kojima, Ichihara (JP); Yukio Yoshida, Ichihara (JP); Kenichi Ogata, Ichihara (JP); Shota Kato, Chiba (JP); Keiichi Narita, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 18/005,692

(22) PCT Filed: Aug. 23, 2021

(86) PCT No.: PCT/JP2021/030748
§ 371 (c)(1),
(2) Date: Jan. 17, 2023

(87) PCT Pub. No.: WO2022/045050
PCT Pub. Date: Mar. 3, 2022

(65) Prior Publication Data
US 2023/0272297 A1 Aug. 31, 2023

(30) Foreign Application Priority Data
Aug. 25, 2020 (JP) .................. 2020-141945

(51) Int. Cl.
*C10M 107/32* (2006.01)
*C10M 107/24* (2006.01)
*C10N 30/02* (2006.01)
*C10N 40/04* (2006.01)
*C10N 40/16* (2006.01)

(52) U.S. Cl.
CPC ........ *C10M 107/32* (2013.01); *C10M 107/24* (2013.01); *C10M 2209/043* (2013.01); *C10M 2209/1055* (2013.01); *C10N 2030/02* (2013.01); *C10N 2040/04* (2013.01); *C10N 2040/16* (2013.01)

(58) Field of Classification Search
CPC .. C09K 5/10; C10N 2030/02; C10N 2040/04; C10N 2040/30; C10N 2030/08; C10N 2040/16; C10N 2020/02; C10N 2030/00; C10N 2040/25; C10N 2020/017; C10N 2040/00; C10N 2020/00; C10N 2030/28; C10N 2040/14; C10M 107/27; C10M 111/02; C10M 105/18; C10M 107/34; C10M 107/32; C10M 2209/043; C10M 2209/1033; C10M 2209/1055; C10M 2207/281; C10M 2207/2825; C10M 2203/1025

See application file for complete search history.

(56) References Cited

U.S. PATENT DOCUMENTS

| | | | | |
|---|---|---|---|---|
| 5,956,959 | A | * | 9/1999 | Sunaga ............. C10M 171/008 62/114 |
| 2013/0090274 | A1 | | 4/2013 | Crossen et al. |
| 2015/0057203 | A1 | | 2/2015 | Tsubouchi |
| 2015/0307762 | A1 | | 10/2015 | Saito et al. |
| 2019/0249102 | A1 | | 8/2019 | Martin et al. |

FOREIGN PATENT DOCUMENTS

| | | |
|---|---|---|
| CN | 103555398 | 2/2014 |
| CN | 103620003 A | 3/2014 |
| CN | 106661477 | 5/2017 |
| CN | 107523374 A | 12/2017 |
| CN | 109844077 A | 6/2019 |
| JP | 48-55185 A | 8/1973 |
| JP | 60-88094 A | 5/1985 |
| JP | 60-255894 A | 12/1985 |
| JP | 2-22390 A | 1/1990 |
| JP | 4-202293 A | 7/1992 |
| JP | 4-227690 A | 8/1992 |
| JP | 2012-214638 A | 11/2012 |
| JP | 2013-530292 A | 7/2013 |
| JP | 2013-199549 A | 10/2013 |
| JP | 2020-512410 A | 4/2020 |
| WO | WO 2014/112417 A1 | 7/2014 |
| WO | WO 2018/078290 A1 | 5/2018 |

OTHER PUBLICATIONS

Office Action issued on Jun. 13, 2023 in the corresponding Japanese Patent Application No. 2020-141945 (with English Translation) therein, 6 pages.
International Search Report issued Nov. 16, 2021 in PCT/JP2021/030748, filed on Aug. 23, 2021, 3 pages.
Extended European Search Report issued May 15, 2024 in European Patent Application No. 21861476.6, 10 pages.

(Continued)

*Primary Examiner* — Vishal V Vasisth
(74) *Attorney, Agent, or Firm* — Oblon, McClelland, Maier & Neustadt, L.L.P.

(57) ABSTRACT

A lubricating oil composition may have a high flash point, a low pour point, and excellent electrical insulation, while having excellent cooling performance. Such a lubricating oil composition may include a base oil (A), wherein the base oil (A) includes at least one synthetic oil (A1) selected from a polyalkylene glycol having a specific degree of polymerization and a polyvinyl ether having a specific degree of polymerization.

20 Claims, No Drawings

(56) References Cited

OTHER PUBLICATIONS

"Dow Tripropylene Glycol, Regular Grade", The Dow Chemical Company, Retrieved from the Internet: URL: https://www.dow.com/documents/117/117-192-01-tripropylene-glycol-regular-grade.pdf?iframe=true, Feb. 1, 2020, pp. 1-2, XP93155375.

"Dowanol TPM", The Dow Chemical Company, Retrieved from the Internet: URL: https://www.dow.com/documents/110/110-00619-01-dowanol-tpm-tds.pdf?iframe=true, Jan. 1, 2012, pp. 1-2, XP93155377.

Schiller et al., "Measurement of activity coefficients at infinite dilution using gas-liquid chromatography. 4. Results for alkylene glycol dialkyl ethers as stationary phases", Journal of Chemical and Engineering Data, vol. 37, No. 4, Oct. 1, 1992, pp. 503-508, XP93155386.

Hatada, "Progressive syntheses of oligomers of methyl vinyl ether and their tacticities", Journal of Polymer Science, Polymer Letters Edition, vol. 14, No. 7, Jul. 1, 1976, pp. 395-399, XP93155400.

Chinese Office Action issued Jun. 22, 2024 in Chinese Application No. 202180039948.6 with English translation, 8 pgs.

Chinese Office Action issued Nov. 22, 2024, in Chinese Application No. 202180039948.6 with English translation therein, 17 pgs.

\* cited by examiner

LUBRICATING OIL COMPOSITION

CROSS-REFERENCE TO RELATED APPLICATIONS

The present application is the national stage of international application PCT/JP2021/030748, filed on Aug. 23, 2021, and claims the benefit of the filing date of Japanese Appl. No. 2020-141945, filed on Aug. 25, 2020.

TECHNICAL FIELD

The present invention relates to a lubricating oil composition, for example, a lubricating oil composition for use for cooling electric vehicle devices.

BACKGROUND ART

Recently, from the viewpoint of global environment protection, carbon dioxide reduction is greatly desired. In the field of automobiles, the development of fuel economy technology is intensive, and hybrid vehicles and electric vehicles (hereinafter these can be referred to as "electric vehicles"), which are vehicles excellent in fuel consumption and environmental performance, have been widely used. Cooling oil excellent in cooling performance and electrical insulation is required for electric vehicle devices of electric vehicles. Since some electric vehicles have a gear reducer, the cooling oil for these need to have lubricity in addition to the above performance.

As a cooling oil for electric vehicle devices, a lubricating oil composition such as an existing automatic transmission fluid (hereinafter also referred to as "ATF") or a continuous variable transmission fluid (hereinafter also referred to as "CVTF") is mainly used, but various cooling oils are being developed instead of these.

For example, as a lubricating oil composition for cooling and/or lubricating electric vehicle engines and various parts thereof, PTL 1 proposes use of a lubricating oil composition containing at least one polyalkylene glycol obtained by polymerization or copolymerization of an alkylene oxide containing 2 to 8 carbon atoms, preferably 2 to 4 carbon atoms.

CITATION LIST

Patent Literature

PTL 1: JP 2020-512410 A

SUMMARY OF INVENTION

Technical Problem

However, the lubricating oil composition of PTL 1 could not be said to be sufficient in cooling performance.

Further, lubricating oil compositions used for cooling electric vehicle devices are required to have a high flash point from the viewpoint of safety, and are required to have a low pour point from the viewpoint of use in cold climates. In addition, as mentioned above, they are required to be excellent in electrical insulation.

The present invention has been made in consideration of the above-mentioned problems and the above-mentioned requirements, and has an object of providing a lubricating oil composition having a high flash point, having a low pour point and excellent in electrical insulation, while having excellent cooling performance.

Solution to Problem

The present inventors have made assiduous studies and have found that a lubricating oil composition containing at least one synthetic oil selected from the group consisting of a polyalkylene glycol having a specific degree of polymerization and a polyvinyl ether having a specific degree of polymerization can solve the above-mentioned problems, and have completed the present invention.

Specifically, the present invention relates to the following [1] to [4].

[1] A lubricating oil composition containing a base oil (A), wherein:

the base oil (A) contains at least one synthetic oil (A1) selected from the group consisting of a polyalkylene glycol having a structural unit represented by the following general formula (1) and a polyvinyl ether having a structural unit represented by the following general formula (2):

wherein $R^1$ and $R^2$ each independently represent a hydrogen atom or a monovalent hydrocarbon group having 1 to 18 carbon atoms, $R^3$ represents a hydrogen atom or an alkyl group having 1 to 4 carbon atoms, n represents an integer of 3 to 5,

wherein $R^5$, $R^6$, and $R^7$ each independently represent a hydrogen atom or a monovalent, hydrocarbon group having 1 to 8 carbon atoms, $R^8$ represents a divalent hydrocarbon group having 2 to 10 carbon atoms, $R^9$ represents a monovalent hydrocarbon group having 1 to 10 carbon atoms, m represents 3 or 4, q represents an integer of 0 to 10.

[2] The lubricating oil composition according to the above [1], which is used for cooling electric vehicle devices.

[3] A use method us using the lubricating oil composition of [1] or [2] for cooling electric vehicle devices.

[4] A cooling system for cooling electric vehicle devices, the cooling system being provided with the lubricating oil composition of the above [1] or [2].

Advantageous Effects of Invention

According to the present invention, there can be provided a lubricating oil composition having a high flash point, having a low pour point and excellent in electrical insulation, while having excellent cooling performance.

DESCRIPTION OF EMBODIMENTS

Embodiments of the present invention are described in detail hereinunder. The present invention is not limited to the following embodiments, and can be modified in any manner within a scope not overstepping the spirit thereof.

The upper limit and the lower limit of the numerical range described in the present specification can be combined in any manner. For example, in the case describing "A to B" and "C to D", a range of "A to D" and a range of "C to B" are in the scope of the invention as numerical ranges. A numerical range of "a lower value to an upper value" described in the present specification means a lower value or more and an upper value or less, unless otherwise specifically indicated.

Also in the present specification, the numerical values in Examples are numerical values that can be used as an upper value or a lower value.

Embodiment of Lubricating Oil Composition

The lubricating oil composition of the present invention is a lubricating oil composition containing a base oil (A), wherein the base oil (A) contains at least one synthetic oil (A1) selected from the group consisting of a polyalkylene glycol having a structural unit represented by the following general formula (1) and a polyvinyl ether having a structural unit represented by the following general formula (2):

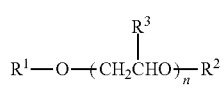

(1)

wherein $R^1$ and $R^2$ each independently represent a hydrogen atom or a monovalent by group having 1 to 18 carbon atoms. $R^3$ represents a hydrogen atom or an alkyl group having 1 to 4 carbon atoms, n represents an integer of 3 to 5,

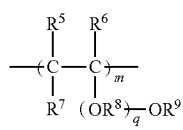

(2)

wherein $R^5$, $R^6$, and $R^7$ each independently represent a hydrogen atom or a monovalent hydrocarbon group having 1 to 8 carbon atoms, $R^8$ represents a divalent, hydrocarbon group having 2 to 10 carbon atoms, $R^9$ represents a monovalent hydrocarbon group having 1 to 10 carbon atoms, m represents 3 or 4, q represents an integer of 0 to 10.

The present inventors have made assiduous studies for the purpose of solving the above-mentioned problems. As a result, the inventors have found that a trimer to pentamer polyalkylene glycol, further a trimer or tetramer polyvinyl ether can have a high flash point, and a low pour point and can be excellent in electrical insulation, while having excellent cooling performance.

Preferably, one embodiment of the lubricating oil composition of the present invention is composed of the base oil (A) alone, but can contain any other component than the base oil (A) within a range not detracting from the advantageous effects of the invention.

Specifically, in one embodiment of the lubricating oil composition of the present invention, the content of the base oil (A) is, from the viewpoint of more readily exhibiting the advantageous effects of the present invention and based on the total amount of the lubricating oil composition, preferably 30% by mass or more, more preferably 50% by mass or more, even more preferably 60% by mass or more, further more preferably 70% by mass or more, further more preferably 80% by mass or more, further more preferably 90% by mass or more, further more preferably 95% by mass or more, further more preferably 99% by mass or more, and is also preferably 100% by mass or less.

The upper limits and the lower limits of these numerical ranges can be combined in any arbitrary manner. Specifically, the content of the base oil (A) is preferably 30% by mass to 100% by mass, more preferably 50% by mass to 100% by mass, even more preferably 60% by mass to 100% by mass, further more preferably 70% by mass to 100% by mass, further more preferably 80% by mass to 100% by mass, further more preferably 90% by mass to 100% by mass, further more preferably 95% by mass to 100% by mass, further more preferably 99% by mass to 100% by mass.

In the case where the lubricating oil composition of one embodiment of the present invention is composed of the base oil (A) alone, the lubricating oil composition can also be referred to as "lubricating base oil".

The base oil (A) is described in detail hereinunder.

Base Oil (A)

The lubricating oil composition of the present invention contains the base oil (A).

The base oil contains at least one synthetic oil (A1) selected from the group consisting of a polyalkylene glycol having a structural unit represented by the above-mentioned general formula (1) and a polyvinyl ether having a structural unit represented by the above-mentioned general formula (2).

In other words, as the base oil (A), at least one selected from the polyalkylene glycol having a structural unit represented by the above general formula (1) can be used alone, or at least one selected from the polyvinyl ether having a structural unit represented by the above general formula (2) can be used alone. At least one selected from the polyalkylene glycol having a structural unit represented by the above general formula (1) and at least one selected from the polyvinyl ether having a structural unit represented by the above general formula (2) can be used in combination.

Here, the content of the synthetic oil (A1) is, from the viewpoint of more readily exhibiting the advantageous effects of the present invention and based on the total amount of the base oil (A), preferably 30% by mass or more, more preferably 40% by mass or more, even more preferably 45% by mass or more, even more preferably 50% by mass or more, and is also preferably 100% by mass or less.

The upper limits and the lower limits of these numerical ranges can be combined in any arbitrary manner. Specifically, the content of is preferably 30% by mass to 100% by mass, more preferably 40% by mass to 100% by mass, even more preferably 45% by mass to 100% by mass, further more preferably 50% by mass to 100% by mass.

Also, the content of the synthetic oil (A1) is, from the viewpoint of more readily exhibiting the advantageous effects of the present invention and based on the total amount of the lubricating oil composition, preferably 30% by mass or more, more preferably 40% by mass or more, even more preferably 45% by mass or more, even more preferably 50% by mass or more, and is also preferably 100% by mass or less.

The upper limits and the lower limits of these numerical ranges can be combined in any arbitrary manner. Specifically, the content is preferably 30% by mass to 100% by mass, more preferably 40% by mass to 100% by mass, even more preferably 45% by mass to 100% by mass, further more preferably 50% by mass to 100% by mass.

Hereinunder the polyalkylene glycol (PAG) and the polyvinyl ether (PVE) that the lubricating oil composition of the present invention contains are described in detail.

Polyalkylene Glycol (PAG)

As the polyalkylene glycol (hereinafter this may lie abbreviated as "PAG"), employed is a polyalkykne glycol having a structural unit represented by the following general formula (1). The PAG can be a homopolymer having one kind of the structural unit alone, or can be a copolymer having at least two kinds thereof as combined. The copolymerization form of the copolymer is not specifically limited, and can be a block copolymer, or can be a random copolymer, or can be a graft copolymer.

The content of the structural unit represented b the following general formula (1) is, from the viewpoint of more readily exhibiting the advantageous effects of the present invention and based on all the structural units of PAG, preferably 50% by mass or more, more preferably 60% by mass or more, even more preferably 70% by mass or more, further more preferably 80% by mass or more, further more preferably 90% by mass or more, further more preferably 95% by mass or more, and is preferably 100% by mass or less.

The upper limits and the lower limits of these numerical ranges can be combined in any arbitrary manner. Specifically the content is preferably 50% by mass to 100% by mass, more preferably 60% by mass to 100% by mass, even more preferably 70% by mass to 100% by mass, further more preferably 80% by mass to 100% by mass, further more preferably 90% by mass to 100% by mass, further more preferably 95% by mass to 100% by mass.

One alone of PAG or at least two thereof can be used either singly or as combined.

(1)

In the general formula (1), $R^1$ and $R^2$ each independently represent a hydrogen atom or a monovalent hydrocarbon group having 1 to 18 carbon atoms, $R^3$ represents a hydrogen or an alkyl group having 1 to 4 carbon atoms, n represents an integer of 3 to 5.

Plural $R^3$'s can be the same as or different from each other.

$R^1$ and $R^2$ can be the same as or different from each other.

$R^1$ and $R^2$ $R^1$ and $R^2$ each independently represent a hydrogen atom or a monovalent hydrocarbon group having 1 to 18 carbon atoms.

When the carbon number of the hydrocarbon group is more than 18, PAG of the type can hardly have excellent cooling performance.

Examples of the hydrocarbon group having 1 to 18 carbon atoms that can be selected for $R^1$ and $R^2$ include an alkyl group having 1 to 18 carbon atoms, such as a methyl group, an ethyl group, various propyl groups, various butyl groups, various pentyl groups, various hexyl groups, various heptyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, and various octadecyl groups; a cycloalkyl group having 3 to 18 carbon atoms, such as a cyclopropyl group, a cyclobutyl group, a cyclopentyl group, a cyclohexyl group, various methylcyclohexyl groups, various ethylcyclohexyl groups, various dimethylcyclohexyl groups, and various trimethylcyclohexyl groups; an aryl group having 6 to 18 carbon atoms, such as a phenyl group, a naphthyl group, various methylphenyl groups, various ethylphenyl groups, various dimethylphenyl groups, and various trimethylphenyl groups; and an arylalkyl group having 6 to 18 carbon atoms, such as a benzyl group, various phenylethyl groups, and various methylbenzyl groups.

In the present specification, an expression of "various X groups" includes all isomers contemplated as X groups. For example, "various alkyl groups" are "linear and branched alkyl groups". For example, "various propyl groups" are "an n-propyl group and an isopropyl group". "Various butyl group" are "an n-butyl group, a sec-butyl group, an isobutyl group and a tert-butyl group".

The carbon number of the monovalent hydrocarbon group that can be selected as $R^1$ and $R^2$ is, from the viewpoint of more readily improving the cooling performance of PAG, preferably 1 to 10, more preferably 1 to 6, even more preferably 1 to 4, further more preferably 1 to 3, further more preferably 1 to 2, further more preferably 1.

The monovalent hydrocarbon group having 1 to 18 carbon atoms that can be selected as $R^1$ and $R^2$ is, from the viewpoint of more readily improving the cooling performance of PAG, preferably an alkyl group. The carbon number of the alkyl group is preferably 1 to 10, more preferably 1 to 6, even more preferably 1 to 4, further more preferably 1 to 3, further more preferably 1 to 2, further more preferably 1.

Here, from the viewpoint of more readily increasing the volume resistivity, preferably at least one of $R^1$ and $R^2$ is a monovalent hydrocarbon group having 1 to 18 carbon atoms, more preferably both $R^1$ and $R^2$ each are a monovalent hydrocarbon group having 1 to 18 carbon atoms. The carbon number of the preferred hydrocarbon group in this case is as mentioned above.

$R^3$ $R^3$ represents a hydrogen atom or an alkyl group having 1 to 4 carbon atoms.

When the carbon number of the alkyl group is more than 4, PAG of the type can hardly have excellent cooling performance.

Examples of the alkyl group having 1 to 4 that can be selected as $R^3$ include a methyl group, an ethyl group, an n-propyl group, an isopropyl group, an n-butyl group, a sec-butyl group, an isobutyl group, and a tert-butyl group.

The carbon number of the alkyl group that can be selected as $R^3$ is, from the viewpoint of more readily improving the cooling performance of PAG, preferably 1 to 3, more preferably 1 to 2, even more preferably 1.

From the viewpoint of the balance of the cooling performance, the volume resistivity and the low-temperature flowability of PAG, $R^3$ is preferably a hydrogen atom or a methyl group. Also from the viewpoint of improving the cooling performance, $R^3$ is preferably a hydrogen atom, and is, from the viewpoint of improving the volume resistivity and the low-temperature flowability, preferably a methyl group.

n n is an integer of 3 to 5.

In the above general formula (1), the value n indicates a degree of polymerization of PAG, and the present invention is characterized by using a trimer to pentamer PAG.

When n is 2 or less, the flash point of PAG lowers and the electrical insulation also lowers. When n is 6 or more, the cooling performance of PAG lowers.

Here, from the viewpoint of improving the cooling performance of PAG, the value of n is preferably 3 to 4, more preferably 3. On the other hand, from the viewpoint of increasing the flash point and improving the electrical insulation, the value of n is preferably 4 to 5, more preferably 5.

From the viewpoint of providing PAG excellent in the balance of the cooling performance, the flash point and the electrical insulation, the value of n is preferably 4.

Molecular Weight

The molecular weight of PAG is, from the viewpoint of providing PAG more excellent in cooling performance, preferably 150 or more, more preferably 160 or more, even more preferably 180 or more, further more preferably 200 or more, further more preferably 220 or more, and is also preferably 1100 or less, more preferably 800 or less, even more preferably 500 or less, further more preferably 400 or less, further more preferably 336 or less.

The upper limits and the lower limits of these numerical ranges can be combined in any arbitrary manner. Specifically, the molecular weight is preferably 150 to 1100, more preferably 160 to 800, even more preferably 180 to 500, further more preferably 200 to 400, further more preferably 220 to 336.

Polyvinyl Ether (PVE)

As the polyvinyl ether (hereinafter this may be abbreviated as "PVE"), employed is a polyvinyl ether having a structural unit represented by the following general formula (2). The PVE can be a homopolymer having one kind of the structural unit alone, or can be a copolymer having at least two kinds thereof as combined. The copolymerization form of the copolymer is not specifically limited, and can be a block copolymer, or can be a random copolymer, or can be a graft copolymer.

The content of the structural unit represented by the following general formula (2) is, based on the structural unit thereof, preferably 50% by mass or more, more preferably 60% by mass or more, even more preferably 70% by mass or more, further more preferably 80% by mass or more, further more preferably 90% by mass or more, further more preferably 95% by mass or more, and is preferably 100% by mass or less.

The upper limits and the lower limits of these numerical ranges can be combined in any arbitrary manner. Specifically, the content is preferably 50% by mass to 100% by mass, more preferably 60% by mass to 100% by mass, even more preferably 70% by mass to 100% by mass, further more preferably 80% by mass to 100% by mass, further more preferably 90% by mass to 100% by mass, further more preferably 95% by mass to 100% by mass.

One kind of PVE can be used singly or at least two kinds thereof can be used in combination.

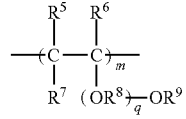

(2)

In the general formula (2), $R^5$, $R^6$, and $R^7$ each independently represent a hydrogen atom or a monovalent hydrocarbon group having 1 to 8 carbon atoms, $R^8$ represents a divalent hydrocarbon group having 2 to 10 carbon atoms, $R^9$ represents a monovalent hydrocarbon group having 1 to 10 carbon atoms, m represents 3 or 4, q represents an integer of 0 to 10.

Plural $R^5$'s can be the same as or different from each other. The same shall apply to plural $R^6$'s, $R^7$'s, $R^8$'s and $R^9$'s.

$R^5$, $R^6$, and $R^7$ can be the same as or different from each other.

When q is 0, the bond between the carbon atom (C) and —$OR^9$ in the general formula (2) is a single bond, and the carbon atom (C) directly bonds to —$OR^9$.

$R^5$, $R^6$, and $R^7$ $R^5$, $R^6$, and $R^7$ each independently represent a hydrogen atom or a monovalent hydrocarbon group having 1 to 8 carbon atoms, When the carbon number of the hydrocarbon group is more than 8, PVE of the type can hardly have excellent cooling performance.

Examples of the hydrocarbon group having 1 to 8 carbon atoms that can be selected as $R^5$, $R^6$, and $R^7$ include an alkyl group having 1 to 8 carbon atoms, such as a methyl group, an ethyl group, various propyl groups, various butyl groups, various pentyl groups, various hexyl groups, various heptyl groups and various octyl groups; a cycloalkyl group having 3 to 8 carbon atoms, such as a cyclopropyl group, a cyclobutyl group, a cyclopentyl group, a cyclohexyl group, various methylcyclohexyl groups, various ethylcyclohexyl groups, and various dimethylcyclohexyl groups; an aryl group having 6 to 8 carbon atoms such as a phenyl group, various methylphenyl groups, various ethylphenyl groups, and various dimethylphenyl groups; and an arylalkyl group having 6 to 8 carbon atoms, such as a benzyl group, various phenylethyl groups and various methylbenzyl groups.

The carbon number of the monovalent hydrocarbon group that can be selected as $R^5$, $R^6$, and $R^7$ is, from the viewpoint of more readily improving the cooling performance of PVE, preferably 1 to 6, more preferably 1 to 4, even more preferably 1 to 3, further more preferably 1 to 2, further more preferably 1.

The monovalent hydrocarbon group having 1 to 8 carbon atoms that can be selected as $R^5$, $R^6$, and $R^7$ is, from the viewpoint of more readily improving the cooling performance of PVE, preferably an alkyl group. The carbon number of the alkyl group is preferably 1 to 6, more preferably 1 to 4, even more preferably 1 to 3, further more preferably 1 to 2, further more preferably 1.

Here, from the viewpoint of more readily improving the cooling performance of PVE, preferably, at least one of $R^5$, $R^6$, and $R^7$ is a hydrogen atom, more preferably at least two are hydrogen atoms, even more preferably all three are hydrogen atoms.

$R^8$ $R^8$ each independently represent a divalent hydrocarbon group having 2 to 10 carbon atoms.

When the carbon number of the hydrocarbon group is more than 10, PVE of the type can hardly have excellent cooling performance.

On the other hand, PVE where the carbon number of the hydrocarbon group is 1 is difficult to produce.

Examples of the divalent hydrocarbon group having 2 to 10 carbon atoms that can be selected as $R^8$ include an alkylene group having 2 to 10 carbon atoms, such as an ethylene group, a 1,2-propylene group, a 1,3-propylene group, various butylene groups, various pentylene groups, various hexylene groups, various heptylene groups, various octylene groups, various nonylene groups and various decylene groups; a cycloalkylene group having 3 to 10 carbon atoms, such as a cyclopropylene group, a cyclobutylene group, a cyclopentylene group, a cyclohexylene group, a methylcyclohexylene group, an ethylcyclohexylene group, and a dimethylcyclohexylene group; a divalent aromatic group having 6 to 10 carbon atoms, such as various phenylene groups, various methylphenylene groups, various ethylphenylene groups, various dimethylphenylene groups and various naphthylene groups; a divalent alkylaromatic group where the alkyl group moiety and the aromatic moiety of an alkylaromatic hydrocarbon, such as toluene, xylene or ethylbenzene each have a monovalent bonding site; and a divalent alkylaromatic group where the alkyl group moiety of an alkylaromatic hydrocarbon, such as xylene or diethylbenzene has a bonding site.

The carbon number of the divalent hydrocarbon group that can be selected as $R^8$ is, from the viewpoint of more readily improving the cooling performance of PVE, preferably 2 to 8, more preferably 2 to 6, even more preferably 2 to 4.

The divalent hydrocarbon group having 2 to 10 carbon atoms that can be selected as $R^8$ is, from the viewpoint of more readily improving the cooling performance of PVE, preferably an alkylene group. The carbon number of the alkylene group is, from the viewpoint of the balance of improving the cooling performance of PVE and increasing the volume resistivity thereof, preferably 2 to 8, more preferably 2 to 6, even more preferably 2 to 4.

$R^9$ $R^9$ represents a monovalent hydrocarbon group having 1 to 10 carbon atoms.

When the carbon number of the hydrocarbon group is more than 10, PVE of the type can hardly have excellent cooling performance.

Examples of the hydrocarbon group having 1 to 10 carbon atoms that can be selected as $R^9$ include an alkyl group having 1 to 10 carbon atoms, such as a methyl group, an ethyl group, various propyl groups, various butyl groups, various pentyl groups, various hexyl groups, various heptyl groups, various octyl groups, various nonyl groups and various decyl groups; a cycloalkyl group having 3 to 10 carbon atoms, such as a cyclopropyl group, a cyclobutyl group, a cyclopentyl group, a cyclohexyl group, various methylcyclohexyl groups, various ethylcyclohexyl groups and various dimethylcylohexyl groups; an aryl group having 6 to 10 carbon atoms, such as a phenyl group, various methylphenyl groups, various ethylphenyl groups, and various dimethylphenyl groups; and an arylalkyl group having 6 to 10 carbon atoms, such as a benzyl group, various phenylethyl groups, various methylbenzyl groups, various phenylpropyl groups, and various phenylbutyl groups.

The carbon number of the monovalent hydrocarbon group that can be selected as $R^9$ is, from the viewpoint of more readily improving the cooling performance of PVE, preferably 1 to 8, more preferably 1 to 6, even more preferably to 4, further more preferably 1 to 3, further more preferably 1 to 2, further more preferably 1.

The monovalent hydrocarbon group having 1 to 10 carbon atoms that can be selected as $R^9$ is, from the viewpoint of more readily improving the cooling performance of PVE, preferably an alkyl group. The carbon number of the alkyl group is preferably 1 to 8, more preferably 1 to 6, even more preferably 1 to 4, further more preferably 1 to 3 or less, further more preferably 1 to 2, further more preferably 1.

q q is an integer of 0 to 10.

When q is an integer of more than 10, PVE of the type can hardly have excellent cooling performance.

The value of q is, from the viewpoint of more readily improving the cooling performance of PVE, preferably 0 to 5, more preferably 0 to 3, even more preferably 0 to 2, further more preferably 0 to 1, further more preferably 0.

m m is 3 or 4.

In the above general formula (2), the value of m indicates a degree of polymerization of PVE, and the present ion is characterized by using a trimer or tetramer PVE.

When m is 2 or less, the flash point of PVE lowers. When m is 5 or more, the cooling performance of PVE is poor.

Here, from the viewpoint of improving the cooling performance of PVE, the value of m is preferably 3. On the other hand, from the viewpoint of increasing the flash point of PVE, the value of m is preferably 4.

Terminal Structure of PVE

The terminal structure of PVE is not specifically limited and is, for example, a hydrogen atom, or a monovalent group derived from a saturated hydrocarbon, an ether, an alcohol, a ketone, an amide or a nitrile.

The terminal of PVE means a part of * in the following formula (2).

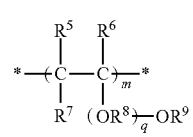

(2)

Molecular Weight

The molecular weight of PVE is, from the viewpoint of providing PVE more excellent in cooling performance, preferably 176 or more, and is also preferably 5,000 or less, more preferably 3,000 or less, even more preferably 1,000 or less, further more preferably 500 or less, further more preferably 234 or less.

The upper limits and the lower limits of these numerical ranges can be combined in any arbitrary manner. Specifically, the molecular weight is preferably 176 to 5,000, more preferably 176 to 3,000, even more preferably 176 to 1,000, further more preferably 176 to 500, further more preferably 176 to 234.

Other Base Oil (A2) Than Synthetic Oil (A1)

In the lubricating oil composition of one embodiment of the present invention, the base oil (A) can contain any other base oil (A2) than the synthetic oil (A1) (hereinafter this may be simply referred to as "the other base oil (A2)").

The content of the other base oil (A2) is, from the viewpoint of exhibiting the performance of the synthetic oil (A1) to more readily exhibit the advantageous effects of the present invention and based on the total amount of the base oil (A), preferably 70% by mass or less, more preferably 60% by mass or less, even more preferably 55% by mass or less.

The other base oil (A2) can be at least one selected from the group consisting of a synthetic oil except the synthetic oil (A1) and a mineral oil.

Examples of the other synthetic oil than the synthetic oil (A1) include poly-α-olefins such as α-olefin homopolymers and α-olefin copolymers (for example, C8-14 olefin copolymers such as ethylene-α-olefin copolymers); isoparaffins; various esters such as polyol esters and dibasic acid esters; various ethers such as polyphenyl ethers (but excepting PVE); alkylbenzenes; alkylnaphthalenes; and GTL base oils obtained by isomerizing wax produced from a natural gas through Fischer-Tropsch synthesis (gas-to-liquid (GTL) wax).

Examples of the mineral oil include atmospheric residues obtained through atmospheric distillation of crude oils such as paraffin-based crude oils, intermediate-based crude oils and naphthene-based crude oils; distillates obtained through reduced-pressure distillation of such atmospheric residues; and mineral oils obtained by purifying the distillates through one or more purification treatments of solvent deasphalting, solvent extraction, hydrocracking, solvent dewaxing, catalytic dewaxing, or hydrorefining.

As the other synthetic oil (A2), a mineral oil alone or plural kinds thereof as combined can be used, and one or plural kinds of synthetic oils other than the synthetic oil (A1) can be used either singly or as combined. Also, at least one mineral oil and at least one synthetic oil other than the synthetic oil (A1) can be used as combined.

Here, the other base oil (A2) is preferably a mineral oil. In use by combining the synthetic oil (A1) and a mineral oil, electrical insulation can be improved more effectively, with sufficiently securing the cooling performance and without greatly lowering the cooling performance thereof, and there can be prepared a mineral oil composition extremely excellent in the balance of cooling performance and electrical insulation.

From the viewpoint, the content of the mineral oil is, based on the total amount of the base oil (A), preferably 10% by mass or more, more preferably 30% by mass or more, even more preferably 40% by mass or more, and is preferably 70% by mass or less, more preferably 60% by mass or less. The upper limits and the lower limits of these numerical ranges can be combined in any arbitrary manner. Specifically, the content is preferably 10% by mass to 70% by mass, more preferably 30% by mass to 60% by mass, even more preferably 40% by mass to 60% by mass.

The content ratio of the synthetic oil (A1) to the mineral oil [(synthetic oil (A1))/(mineral oil)] is, as a ratio by mass, preferably 30/70 or more, more preferably 40/60 or more, and is also preferably 90/10 or less, more preferably 70/30 or less, even more preferably 60/40 or less. The upper limits and the lower limits of these numerical ranges can be combined in any arbitrary manner. Specifically, the content ratio is preferably 30/70 to 90/10, more preferably 40/60 to 70/30, even more preferably 40/60 to 60/40.

The content of at least one synthetic oil (A1') selected from the group consisting of PAG of the general formula (1) where n is an integer of 2 or less, PAG where n is an integer of 6 or more (in the formula, $R^1$, $R^2$, and $R^3$ are as described above), and PVE of the general formula (2) where m is an integer of 2 or less and PVE where m is an integer of 5 or more (in the formula, $R^5$, $R^6$, $R^7$, $R^8$, and $R^9$ are as described above) is, from the viewpoint of more readily exhibiting the advantageous effects of the present invention, preferably small.

Specifically, the content of the synthetic oil (A1') is preferably 10 parts by mass or less relative to 100 parts by mass of the synthetic oil (A1), more preferably 5 parts by mass or less, even more preferably 3 parts by mass or less, further more preferably 1 part by mass or less, further more preferably 0 part by mass.

Properties of Base Oil (A)

In one embodiment of the present invention, the base oil (A) preferably satisfies the properties defined in the following requirements (1) to (8):

Requirement (1): Relative Heat Transfer Coefficient

In one embodiment of the present invention, preferably, the relative heat transfer coefficient of the base oil (A) is 1.01 or more (requirement (1)).

The relative heat transfer coefficient is a heat transfer coefficient relative to the heat transfer coefficient at 20° C., referred to as 1.00, of a mineral oil (α) satisfying the following requirements (α1) to (α4).

Requirement (α1): The kinematic viscosity at 20° C. is 7.06 mm²/s.
Requirement (α2): The specific heat at 20° C. is 1.67 kJ/(kg·K).
Requirement (α3): The density at 20° C. is 0.857 g/cm³.
Requirement (α4): The thermal conductivity at 20° C. is 0.141 W/(m·K).

The heat transfer coefficient is an index of easiness of heat transfer between two substances (namely, the base oil (A) and a substance to be cooled). The requirement (1) defines the heat transfer coefficient of the base oil (A) as a relative heat transfer coefficient based on the heat transfer coefficient of the mineral oil (α). It can be said that a larger relative heat transfer coefficient defined by the requirement (1) ensures excellent cooling performance.

A heat transfer coefficient at 20° C. of a fluid ($A_\alpha$, unit: W/(m²·K)) can be calculated according to the following formula (I).

$$A_\alpha = \frac{(A_{D20})^{1/3} \times (A_{C20})^{1/3} \times (A_{HC20})^{2/3}}{(A_{KV20})^{1/6}} \qquad (I)$$

In the above formula (I), $A_{D20}$ is a density at 20° C. of a fluid (unit: g/cm³). $A_{C20}$ is a specific heat at 20° C. of a fluid (unit: kJ/(kg·K)). $A_{HC20}$ is a thermal conductivity at 20° C. of a fluid (unit: W/(m·K)). $A_{KV20}$ is a kinematic viscosity at 20° C. of a fluid (unit: mm²/s).

Here, the relative heat transfer coefficient defined by the requirement (1) is preferably 1.03 or more, more preferably 1.06 or more, even more preferably 1.10 or more. In general, it is 1.50 or less.

The upper limits and the lower limits of these numerical ranges can be combined in any arbitrary manner. Specifically, the coefficient is preferably 1.01 to 1.50, more preferably 1.03 to 1.50, even more preferably 1.06 to 1.50, further more preferably 1.10 to 1.50.

Requirement (2): Kinematic Viscosity

In one embodiment of the present invention, preferably, the kinematic viscosity at 40° C. (hereinafter this may be referred to as "40° C. kinematic viscosity) of the base oil (A) is 6.00 mm²/s or less (requirement (2)). When the viscosity of the base oil (A) is reduced more, then the cooling performance thereof betters, but on the contrary, the flash point of the base oil (A) tends to lower. However, in the present invention, the base oil (A) contains the synthetic oil (A1), and therefore, though having a low viscosity, the base oil (A) can secure a high flash point.

Here, the 40° C. kinematic viscosity of the base oil (A), as defined by the requirement (2), is more preferably 5.80 mm²/s or less, even preferably 5.60 mm²/s or less, further preferably 5.40 mm²/s or less, and is generally 1.20 mm²/s or more.

The upper limits and the lower limits of these numerical ranges can be combined in any arbitrary manner. Specifically, the kinematic viscosity is preferably 1.20 mm²/s to 6.00 mm²/s, more preferably 1.20 mm²/s to 5.80 mm²/s, even more preferably 1.20 mm²/s to 5.60 mm²/s, further more preferably 1.20 mm²/s to 5.40 mm²/s.

Also in the requirement (2), it is preferable that, in addition to the 40° C. viscosity of the base oil (A), the kinematic viscosity at 20° C. (hereinafter also referred to as "20° C. kinematic viscosity") of the base oil (A) is equal to a specific range or less. Specifically, the 20° C. kinematic viscosity is preferably 11.0 mm²/s or less, more preferably 10.5 mm²/s or less, even more preferably 10.0 mm²/s or less, and is generally 1.50 mm²/s or more.

The upper limits and the lower limits of these numerical ranges can be combined in any arbitrary manner. Specifically, the 20° C. kinematic viscosity is preferably 1.50 mm²/s to 11.0 mm²/s, more preferably 1.50 mm²/s to 10.5 mm²/s, even more preferably 1.50 mm²/s to 10.0 mm²/s.

In the present specification, the 40° C. kinematic viscosity and the 20° C. kinematic viscosity of the base oil (A) are values measured or calculated according to JIS K2283:2000.

Requirement (3): Specific Heat

In one embodiment of the present invention, the specific heat at 20° C. of the base oil (A) is preferably 1.60 kJ/(kg·K) or more (requirement (3)). Having a higher specific heat at 20° C., the cooling performance of the base oil (A) can improve more readily.

From the above viewpoint, the specific heat at 20° C. of the base oil (A), as defined by the requirement (3), is more preferably 1.62 kJ/(kg·K) or more, even more preferably 1.64 kJ/(kg·K) or more, and is generally 1.75 kJ/(kg·K) or less.

The upper limits and the lower limits of these numerical ranges can be combined in any arbitrary manner. Specifically, the specific heat at 20° C. is preferably 1.60 kJ/(kg·K) to 1.75 kJ/(kg·K), more preferably 1.62 kJ/(kg·K) to 1.75 kJ/(kg·K), even more preferably 1.64 kJ/(kg·K) to 1.75 kJ/(kg·K).

In the present specification, the specific heat at 20° C. of the base oil (A) means a value calculated according to the following formula (f1) in which a found value of thermal conductivity and a found value of thermal effusivity as measured with a thermal conductivity measuring apparatus, and a density at 20° C. as measured according to the method described hereinunder are used.

(Specific heat at 20° C.)=(thermal effusivity at 20° C.)²/{thermal conductivity at 20° C.)×(density at 20° C.)} (f1)

Requirement (4): Density

In one embodiment of the present invention, the density at 20° C. of the base oil (A) is preferably 0.840 g/cm³ or more (requirement (4)). Having a higher density at 20° C., the cooling performance of the base oil (A) can improve more readily.

From this viewpoint, the density at 20° C. of the base oil (A) defined by the requirement (4) is more preferably 0.850 g/cm³ or more, even more preferably 0.880 g/cm³ or more, further more preferably 0.900 g/cm³ or more, and is generally 0.980 g/cm³ or less.

The upper limits and the lower limits of these numerical ranges can be combined in any arbitrary manner. Specifically, the density at 20° C. is preferably 0.840 g/cm³ to 0.980 g/cm³, more preferably 0.850 g/cm³ to 0.980 g/cm³, even more preferably 0.880 g/cm³ to 0.980 g/cm³, further more preferably 0.900 g/cm³ to 0.980 g/cm³.

In the present specification, the density at 20° C. of the base oil (A) means a value measured according to JIS K 2249-1:2011 (Crude and Refined Products-Method for Measuring Density—Part 1: Oscillation Method).

Requirement (5): Thermal Conductivity

In one embodiment of the present invention, the thermal conductivity at 20° C. of the base oil (A) is preferably 0.135 W/(m·K) or more (requirement (5)). A larger value of the thermal conductivity at 20° C. can readily improve the cooling performance of the base oil (A).

From this view point, the thermal conductivity at 20° C. of the base oil (A) defined by the requirement (5) is more preferably 0.140 W/(m·K) or more, even more preferably 0.143 W/(m·K) or more, further more preferably 0.145 W/(m·K) or more, further more preferably 0.147 W/(m·K) or more, and is generally 0.165 W/(m·K) or less.

The upper limits and the lower limits of these numerical ranges can be combined in any arbitrary manner. Specifically, the thermal conductivity at 20° C. is preferably 0.135 W/(m·K) to 0.165 W/(m·K), more preferably 0.140 W/(m·K) to 0.165 W/(m·K), even more preferably 0.143 W/(m·K) to 0.165 W/(m·K), further more preferably 0.145 W/(m·K) to 0.165 W/(m·K), further more preferably 0.147 W/(m·K) to 0.165 W/(m·K).

In the present specification, the thermal conductivity at 20° C. of the base oil (A) means a thermal conductivity measured with a thermal conductivity measuring apparatus.

Requirement (6): Volume Resistivity

In one embodiment of the present invention, the volume resistivity at 25° C. of the base oil (A) is preferably $1.00 \times 10^8$ Ω·m or more (requirement (6)). A higher volume resistivity means more excellent electrical insulation of the base oil (A).

Here, from the viewpoint of bettering the electrical insulation of the base oil (A), the volume resistivity at 25° C. defined by the requirement (6) is preferably $1.00 \times 10^9$ Ω·m or more, more preferably $5.00 \times 10^9$ Ω·m or more, even more preferably $8.00 \times 10^9$ Ω·m or more, and is generally $1.00 \times 10^{13}$ Ω·m or less.

The upper limits and the lower limits of these numerical ranges can be combined in any arbitrary manner. Specifically, the volume resistivity at 25° C. is preferably $1.00 \times 10^8$ Ω·m to $1.00 \times 10^{13}$ Ω·m, more preferably $1.00 \times 10^9$ Ω·m to $1.00 \times 10^{13}$ Ω·m, even more preferably $5.00 \times 10^9$ Ω·m to $1.00 \times 10^{13}$ Ω·m, even more preferably $8.00 \times 10^9$ Ω·m to $1.00 \times 10^{13}$ Ω·m.

From the viewpoint of increasing the volume resistivity of the base oil (A), preferably, the synthetic oil (A1) contains a polyvinyl ether represented by the general formula (2).

In the present specification, the volume resistivity at 25° C. of the base oil (A) means a value measured under the condition of a measurement temperature 25° C. and an applied voltage 250 V, according to JIS C2101:1999.

Requirement (7): Flash Point

In one embodiment of the present invention, the flash point of the base oil (A) is preferably 100° C. or higher (requirement (7)). Having a flash point of 100° C. or higher, the base oil (A) is difficult to fire and the safety thereof is easily improved.

Here, the flash point defined by the requirement (7) is preferably 110° C. or higher, more preferably 120° C. or higher, even more preferably 130° C. or higher, further more preferably 140° C. or higher, further more preferably 150° C. or higher, and is generally 200° C. or lower.

The upper limits and the lower limits of these numerical ranges can be combined in any arbitrary manner. Specifically, the flash point is preferably 100° C. to 200° C., more preferably 110° C. to 200° C., even more preferably 120° C. to 200° C., further more preferably 130° C. to 200° C., further more preferably 140° C. to 200° C., further more preferably 150° C. to 200° C.

In the present specification, the flash point of the base oil (A) means a value measured by a Cleveland open-cup method (COC method) according to JIS K 2265-4:2007.

Requirement (8): Pour Point

In one embodiment of the present invention, the pour point of the base oil (A) is preferably −40° C. or lower (requirement (8)). Having a pour point of −40° C. or lower, the base oil (A) can withstand use in cold areas.

Here, the pour point defined by the requirement (8) is more preferably −45° C. or lower, even more preferably −50° C. or lower, further more preferably −55° C. or lower, further more preferably −60° C. or lower.

In the present specification, the pour point of the base oil (A) means a value measured according to JIS K 2269:1987 (Test Method for Pour Point of Crude Oils and Petroleum Products and for Cloud Point of Petroleum Products).

Additives

The lubricating oil composition of one embodiment of the present invention can contain, as needed and within a range not detracting from the advantageous effects of the invention, additives such as antiwear agent, antioxidant, viscosity index improver, rust inhibitor, metal deactivator, antifoaming agent, and detergent-dispersant.

One alone or two or more kinds of these additives can be used as combined.

Through not specifically limited, the total content of these additives is, for example, approximately 0 to 20% by weight based on the total amount of the composition.

Antiwear Agent

Not specifically limited, the antiwear agent can be appropriately selected from ordinary antiwear agents heretofore used in lubricating oils. For example, in the case where an electric motor and a gear reducer are combined for use in a hybrid vehicle or an electric vehicle, preferably, at least one selected from neutral phosphorus compounds, acidic phosphite esters or amine salts thereof and sulfur compounds is used so as not to worsen electrical insulation as much as possible.

The content of the antiwear agent is, though not specifically limited thereto, for example, approximately 0.01 to 5% by weight based on the total amount of the composition.

The neutral phosphorus compound includes aromatic neutral phosphates such as tricresyl phosphate, triphenyl phosphate, trixylenyl phosphate, tricresylphenyl phosphate, tricresyl thiophosphate, and triphenyl thiophosphate; aliphatic neutral phosphates such as tributyl phosphate, tri-2-ethylhexyl phosphate, tributoxy phosphate, and tributyl thiophosphate; aromatic neutral phosphites such as triphenyl phosphite, tricresyl phosphite, trisnonylphenyl phosphite, diphenyl-mono-2-ethylhexyl phosphite, diphenyl-monotridecyl phosphite, tricresyl thiophosphite, and triphenyl thiophosphite; and aliphatic neutral phosphites such as tributyl phosphite, trioctyl phosphite, trisdecyl phosphite, tristridecyl phosphite, trioleyl phosphite, tributyl thiophosphite, and trioctyl thiophosphite. These can be used singly, or can be used as a combination of two or more thereof.

The acidic phosphite ester includes aliphatic acidic phosphate amine salts such as di-2-ethylhexyl acid phosphate amine salt, dilauryl acid phosphate amine salt, and dioleyl acid phosphate amine salt; aliphatic acidic phosphite esters and amine salts thereof such as di-2-ethylhexylhydrogen phosphite, dilaurylhydrogen phosphite, and dioleylhydrogen phosphite; aromatic acidic phosphate amine salts such as diphenyl acid phosphate amine salt, and dicresyl acid phosphate amine salt; aromatic acidic phosphite esters and amine salts thereof such as diphenylhydrogen phosphite, and dicresylhydrogen phosphite; sulfur-containing acidic phosphate amine salts such as S-octylthioethyl acid phosphate amine salt, and S-dodecylthioethyl acid phosphate amine salt; and sulfur-containing acidic phosphite esters and amine salts thereof such as S-octylthioethylhydrogen phosphite, and S-dodecylthioethylhydrogen phosphite. These can be used singly, or can be used as a combination of two or more thereof.

Various sulfur compounds are usable, and examples thereof include thiadiazol compounds, polysulfide compounds, dithiocarbamate compounds, sulfurized oil and fat compounds, and sulfurized olefin compounds. These can be used singly, or can be used as a combination of two or more thereof.

Antioxidant

As the antioxidant, any one can be appropriately selected from known antioxidants heretofore used in lubricating oils.

Examples thereof include amine-based antioxidants (diphenylamines, naphthylamines), phenol-based antioxidants, molybdenum-based antioxidants, sulfur-based antioxidants, and phosphorus-based antioxidants. The antioxidant can be used singly, or can be used as a combination of two or more thereof. Not specifically limited, the content of the antioxidant can be, for example, approximately 0.05 to 7% by weight based on the total amount of the composition.

Viscosity Index Improver

Examples of the viscosity index improver include polymethacrylates, dispersant-type polymethacrylates, olefin copolymers (e.g., ethylene-propylene copolymers), dispersant-type olefin copolymers, and styrene copolymers (e.g., styrene-diene copolymers, styrene-isoprene copolymers). The viscosity index improver can be used singly, or can be used as a combination of two or more thereof. Not specifically limited but from the viewpoint of the blending effect, the blending amount (in terms of resin content) of the viscosity index improver can be, for example, approximately 0.1% by weight or more and 10% by weight or less based on the total amount of the composition.

Rust Inhibitor

Examples of the rust inhibitor include fatty acids, alkenylsuccinic acid half esters, fatty acid soaps, alkylsulfonic acid salts, polyhydric alcohol fatty acid ester, fatty acid amides, oxidized paraffins, and alkylpolyoxyethylene ethers. The rust inhibitor can be used singly, or can be used as a combination of two or more thereof. Not specifically limited, a preferred blending amount of the rust inhibitor is approximately 0.01% by weight or more and 3% by weight or less based on the total amount of the composition.

Metal Deactivator

Examples of the metal deactivator include benzotriazole, triazole derivatives, benzotriazole derivatives, and thiadiazole derivatives. The metal deactivator can be used singly, or can be used as a combination of two or more thereof. Not specifically limited, the content of the metal deactivator is preferably 0.01 to 5% by weight based on the total amount of the composition.

Antifoaming Agent

Examples of the antifoaming agent include silicone compounds such as dimethylpolysiloxane; and polyacrylates. The antifoaming agent can be used singly, or can be used as a combination of two or more thereof. Not specifically limited, the content of the antifoaming agent can be approximately 0.001% by weight or more to 0.5% by weight or less based on the total amount of the composition.

Detergent-Dispersant

Examples of the detergent-dispersant include succinic acid imide compounds, boron imide compounds and acid amide compounds. The detergent dispersant can be used singly, or can be used as a combination of two or more thereof. Not specifically limited, the content of the detergent dispersant is preferably 0.1 to 20% by weight based on the total amount of the composition.

Properties of Lubricating Oil Composition

The lubricating oil composition of one embodiment of the present invention preferably satisfies the requirements (1) to (8) as defined hereinabove as the requirements for the base oil (A). Preferred ranges are also as defined in the above-mentioned requirements (1) to (8).

Use of Lubricating Oil Composition

The lubricating oil composition of the present invention has excellent cooling performance, ensures electrical insulation and has a high flash point. In addition, it also ensures lubricity.

Consequently, the lubricating oil composition of the present invention can be favorably used as a cooling oil for cooling various devices. In particular, it can be favorably used as a cooling oil for cooling electric vehicle devices for electric vehicles.

Specifically, for example, the lubricating oil composition can be favorably used as a cooling oil for cooling electric vehicle devices of one or more selected from the group consisting of motors, generators, electric condensers, converters, inverters, engines and transmissions.

The motor can be a motor dedicated to driving or can be a motor also serving as a generator.

The generator mentioned above as an electric vehicle device means a generator mounted separately from a motor serving also as a generator.

Examples of the electric condenser includes a battery and a capacitor.

One embodiment of the present invention provides a use method of using the lubricating oil composition of the present invention for cooling electric vehicle devices of electric vehicles. The electric vehicle devices include, as described above, at least one selected from motors, generators, capacitors, converters, inverters, engines and transmissions.

Cooling System

The lubricating oil composition of the present invention has excellent cooling performance, ensures electrical insulation and has a high flash point. In addition, it also ensures lubricity.

The lubricating oil composition of the present invention has excellent cooling performance, ensures electrical insulation and has a high flash point. In addition, it also ensures lubricity.

Consequently, for example, by circulating through various devices such as electric vehicle devices, the lubricating oil composition of the present invention can lubricate and cool the devices.

Here, one embodiment of the present invention provides a cooling system for cooling electric vehicle devices, which is provided with the lubricating oil composition of the present invention. Examples of the electric vehicle devices are, as described above, one or more from the group consisting of motors, generators, electric condensers, converters, inverters, engines and transmissions.

The cooling system is provided with a circulation circuit through which the lubricating oil composition circulates, and a cooling target portion. The cooling target portion is the above-mentioned device (preferably the above-mentioned electric vehicle device). The cooling mode for the cooling target portion may be any of a direct cooling mode or an indirect cooling mode, and can be appropriately defined in accordance with the cooling mode required for the device (preferably the electric vehicle device). The cooling system can be further provided with a feeder for feeding the lubricating oil composition to the cooling target portion. In addition, the system can be further provided with a sensor part to monitor the temperature of the cooling target portion and a controller to control the operation of the feeder in accordance with the temperature monitored by the sensor part.

In the present specification, the "cooling system" means an "object" in which a plurality of components including at least the circulation circuit and the cooling target portion are collected to exhibit a function of cooling the cooling target portion, and can also be referred to as a "device" in which a plurality of components are combined to perform a function of cooling the cooling target portion.

Production Method for Lubricating Oil Composition

The production method for the lubricating oil composition of the present invention is not specifically limited. The production method for the lubricating oil composition of one embodiment includes a step of preparing a base oil (A) which contains at least one synthetic oil (A1) selected from the group consisting of a polyalkylene glycol having a structural unit represented by the above-mentioned general formula (1) and a polyvinyl ether having a structural unit represented by the above-mentioned general formula (2).

The method can further include a step of optionally mixing additives in the base oil (A). The additives can be blended in any method, and the blending order and the blending method are not limited.

Embodiments of the Invention Provided

The present invention provided the following embodiments [1] to [12].

[1] A lubricating oil composition containing a base oil (A), wherein:
the base oil (A) contains at least one synthetic oil (A1) selected from the group consisting of a polyalkylene glycol having a structural unit represented by the following general formula (1) and a polyvinyl ether having a structural unit represented by the following general formula (2):

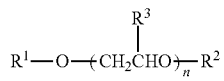

(1)

wherein $R^1$ and $R^2$ each independently represent a hydrogen atom or a monovalent hydrocarbon group having 1 to 18 carbon atoms, $R^3$ represents a hydrogen atom or an alkyl group having 1 to 4 carbon atoms, n represents an integer of 3 to 5,

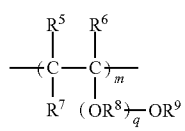

(2)

wherein $R^5$, $R^6$, and $R^7$ each independently represent a hydrogen atom or a monovalent hydrocarbon group having 1 to 8 carbon atoms, $R^8$ represents a divalent hydrocarbon group having 2 to 10 carbon atoms, $R^9$ represents a monovalent hydrocarbon group having 1 to 10 carbon atoms, m represents 3 or 4, q represents an integer of 0 to 10.

[2] The lubricating oil composition according to [1], wherein in the general formula (1), $R^3$ is a methyl group.

[3] The lubricating oil composition according to [1] or [2], wherein in the general formula (2),
$R^5$, $R^6$, and $R^7$ are hydrogen atoms,
$R^9$ is a methyl group,
q=0.

[4] The lubricating oil composition according to any of [1] to [3], wherein the content of the synthetic oil (A1) is, based on the total amount of the base oil (A), 30% by mass to 100% by mass.

[5] The lubricating oil composition according to any of [1] to [4], wherein:
the relative heat transfer coefficient is 1.01 or more, and
the relative heat transfer coefficient of the base oil (A) is a heat transfer coefficient relative to the heat transfer coefficient at 20° C., referred to as 1.00, of a mineral oil (α) satisfying the following requirements (α1) to (α4):
Requirement (α1): The kinematic viscosity at 20° C. is 7.06 mm²/s,
Requirement (α2): The specific heat at 20° C. is 1.67 kJ/(kg·K),
Requirement (α3): The density at 20° C. is 0.857 g/cm³,
Requirement (α4): The thermal conductivity at 20° C. is 0.141 W/(m·K).

[6] The lubricating oil composition according to any of [1] to [5], wherein the volume resistivity at 25° C. is $1.00 \times 10^8$ Ω·m or more.

[7] The lubricating oil composition according to any of [1] to [6], wherein the flash point is 100° C. or higher.

[8] The lubricating oil composition according to any of [1] to [7], wherein the pour point is −40° C. or lower.

[9] The lubricating oil composition according to any of [1] to [8], which is used for cooling electric vehicle devices.

[10] The lubricating oil composition according to [9], wherein the electric vehicle device is at least one selected from the group consisting of motors, generators, capacitors, converters, inverters, engines and transmissions.

[11] A use method of using the lubricating oil composition of any of [1] to [10] for cooling electric vehicle devices.

[12] A cooling system for cooling electric vehicle devices, provided with the lubricating oil composition of any of [1] to [10].

EXAMPLES

The present invention is described more specifically with reference to the following Examples, but the present invention is not limited to the following Examples.

Examples 1 to 9 and Comparative Examples 1 to 9

One alone or two of various base oils shown below were used either singly or as combined as shown in Tables 1 to 3 to prepare lubricating oil compositions of Examples 1 to 9 and Comparative Examples 1 to 9.

Polyalkylene Glycol

Five kinds of polypropylene glycols "PPG-2" to "PPG-6" of the above general formula (1), where $R^1$, $R^2$, and $R^3$ are methyl groups and where the value n alone differs, were used.
"PPG-2": n=2, molecular weight=162
"PPG-3": n=3, molecular weight=220

"PPG-4": n=4, molecular weight=278
"PPG-5": n=5, molecular weight=336
"PPG-6": n=6, molecular weight=394

Polyvinyl Ether

Four kinds of polyvinyl ethers "PVE(Me)-2" to "PVE(Me)-5" of the above general formula (2), where $R^5$, $R^6$, and $R^7$ are hydrogen atoms, q is 0, $R^9$ is a methyl group, and m alone differs, were used.

"PVE(Me)-2": m=2, both ends were hydrogens, molecular weight=118
"PVE(Me)-3": m=3, both ends were hydrogens, molecular weight=176
"PVE(Me)-4": m=4, both ends were hydrogens, molecular weight=234
"PVE(Me)-5": m=5, both ends were hydrogens, molecular weight=292

Ester

"Ester 1": 2-ethylhexyl oleate
"Ester 2": Bis(2-ethylhexyl) Azelate

Mineral Oil

"Mineral oil 1": mineral oil corresponding to VG2
"Mineral oil 2": mineral oil corresponding to VG5, and corresponding to the above-mentioned mineral oil (α).

Others

Ethylene glycol
Water

Method for Measurement of Various Physical Properties

Various properties of the lubricating oil compositions of Examples 1 to 9 and Comparative Examples 1 to 9 were measured and calculated according to the process mentioned below. In these Examples, investigations were made without blending any other additive than the base oil, and therefore the properties of the lubricating oil compositions are also the properties of the base oils.

(1) 40° C. Kinematic Viscosity
Measured according to JIS K2283:2000.
(2) 20° C. Kinematic Viscosity
Calculated based on the found data of the 40° C. kinematic viscosity and the 100° C. kinematic viscosity measured according to JIS K2283:2000.
(3) Density at 20° C.
Measured according to JIS K 2249-1:2011 (Crude and Refined Products-Method for Measuring Density—Part 1: Oscillation Method).
(4) Specific Heat at 20° C.
Using a thermal conductivity measuring apparatus (by C-THERM Technology Corporation, TCi), a value of thermal conductivity and a value of thermal effusivity were measured, and the specific heat was calculated according to the above-mentioned formula (f1). The density at 20° C. is the value measured in the above (3).
(5) Thermal Conductivity at 20° C.
Using a thermal conductivity measuring apparatus (by C-THERM Technology Corporation, TCi), the thermal conductivity was measured.
(6) Flash Point
Measured by a Cleveland open-cup method (COC method) according to JIS K 2265-4:2007.
(7) Volume Resistivity at 25° C.
Measured under the condition of a measurement temperature 25° C. and an applied voltage 250 V, according to JIS C2101:1999.

Calculation of Relative Heat Transfer Coefficient

From the density at 20° C., the specific heat at 20° C., the thermal conductivity at 20° C. and the kinematic viscosity at 20° C. measured as above, the heat transfer coefficient at 20° C. of the lubricating oil compositions of Examples 1 to 9 and Comparative Examples 1 to 9 was calculated according to the above formula (I).

Then, relative to the heat transfer coefficient of Comparative Example 8 (using the mineral oil 2 corresponding to the mineral oil (α)) referred to as 1.00, the heat transfer coefficient of Examples 1 to 9, Comparative Examples 1 to 7, and Comparative Example 9 was calculated and referred to as a relative heat transfer coefficient thereof.

Evaluation

In these Examples, the acceptability criteria are as follows.
Relative heat transfer coefficient: 1.01 or more
Volume resistivity: $1.00 \times 10^8$ Ω·m or more
Flash point: 100° C. or higher
Pour point: −40° C. or lower
The results are shown in Tables 1 to 3.

TABLE 1

| | | unit | Example 1 | Example 2 | Example 3 | Comparative Example 1 | Comparative Example 2 |
|---|---|---|---|---|---|---|---|
| Lubricating Oil Composition | PPG-3 | mass % | 100 | — | — | — | — |
| | PPG-4 | mass % | — | 100 | — | — | — |
| | PPG-5 | mass % | — | — | 100 | — | — |
| | PPG-2 | mass % | — | — | — | 100 | — |
| | PPG-6 | mass % | — | — | — | — | 100 |
| | PVE(Me)-3 | mass % | — | — | — | — | — |
| | PVE(Me)-4 | mass % | — | — | — | — | — |
| | PVE(Me)-2 | mass % | — | — | — | — | — |
| | PVE(Me)-5 | mass % | — | — | — | — | — |
| | Ester 1 | mass % | — | — | — | — | — |
| | Ester 2 | mass % | — | — | — | — | — |
| | Mineral Oil 1 | mass % | — | — | — | — | — |
| | Mineral Oil 2 | mass % | — | — | — | — | — |
| | Ethylene Glycol | mass % | — | — | — | — | — |
| | Water | mass % | — | — | — | — | — |

TABLE 1-continued

|  |  | unit | Example 1 | Example 2 | Example 3 | Comparative Example 1 | Comparative Example 2 |
|---|---|---|---|---|---|---|---|
| Properties of Lubricating Oil Composition | Kinematic Viscosity, 40° C. | mm$^2$/s | 1.570 | 2.515 | 5.016 | 0.9000 | 8.384 |
|  | Kinematic Viscosity, 20° C. | mm$^2$/s | 2.021 | 3.707 | 8.155 | 1.120 | 14.84 |
|  | Density, 20° C. | g/cm$^3$ | 0.9165 | 0.9279 | 0.9389 | 0.8859 | 0.9522 |
|  | Specific Heat, 20° C. | kJ/(kg · K) | 1.66 | 1.67 | 1.68 | 1.64 | 1.69 |
|  | Thermal Conductivity, 20° C. | W/(m · K) | 0.148 | 0.151 | 0.154 | 0.139 | 0.1561 |
|  | Relative Heat Transfer Coefficient | — | — | 1.298 | 1.197 | 1.069 | 1.353 | 0.983 |
|  | Flash Point | ° C. | 104 | 156 | 187 | 56 | 220 |
|  | Pour Point | ° C. | <−60 | <−60 | <−60 | <−60 | <−60 |
|  | Volume Resistivity, 25° C. | 10$^8$ Ω · m | 3.82 | 4.30 | 4.80 | 0.38 | 5.10 |

TABLE 2

|  |  | unit | Example 4 | Example 5 | Comparative Example 3 | Comparative Example 4 |
|---|---|---|---|---|---|---|
| Lubricating Oil Composition | PPG-3 | mass % | — | — | — | — |
|  | PPG-4 | mass % | — | — | — | — |
|  | PPG-5 | mass % | — | — | — | — |
|  | PPG-2 | mass % | — | — | — | — |
|  | PPG-6 | mass % | — | — | — | — |
|  | PVE(Me)-3 | mass % | 100 | — | — | — |
|  | PVE(Me)-4 | mass % | — | 100 | — | — |
|  | PVE(Me)-2 | mass % | — | — | 100 | — |
|  | PVE(Me)-5 | mass % | — | — | — | 100 |
|  | Ester 1 | mass % | — | — | — | — |
|  | Ester 2 | mass % | — | — | — | — |
|  | Mineral Oil 1 | mass % | — | — | — | — |
|  | Mineral Oil 2 | mass % | — | — | — | — |
|  | Ethylene Glycol | mass % | — | — | — | — |
|  | Water | mass % | — | — | — | — |
| Properties of Lubricating Oil Composition | Kinematic Viscosity, 40° C. | mm$^2$/s | 2.579 | 5.260 | 1.239 | 9.676 |
|  | Kinematic Viscosity, 20° C. | mm$^2$/s | 4.010 | 9.663 | 1.803 | 20.64 |
|  | Density, 20° C. | g/cm$^3$ | 0.9429 | 0.9622 | 0.9128 | 0.9740 |
|  | Specific Heat, 20° C. | kJ/(kg · K) | 1.66 | 1.66 | 1.61 | 1.63 |
|  | Thermal Conductivity, 20° C. | W/(m · K) | 0.152 | 0.153 | 0.144 | 0.154 |
|  | Relative Heat Transfer Coefficient | — | 1.190 | 1.039 | 1.284 | 0.918 |
|  | Flash Point | ° C. | 120 | 164 | 76 | 195 |
|  | Pour Point | ° C. | <−60 | <−60 | <−60 | <−60 |
|  | Volume Resistivity, 25° C. | 10$^8$ Ω · m | 116 | 256 | 43 | 587 |

TABLE 3

|  |  | unit | Example 6 | Example 7 | Example 8 | Example 9 | Comparative Example 5 |
|---|---|---|---|---|---|---|---|
| Lubricating Oil Composition | PPG-3 | mass % | 30 | — | — | — | — |
|  | PPG-4 | mass % | — | 30 | — | — | — |
|  | PPG-5 | mass % | — | — | — | — | — |
|  | PPG-2 | mass % | — | — | — | — | — |
|  | PPG-6 | mass % | — | — | — | — | — |
|  | PVE(Me)-3 | mass % | — | — | 30 | — | — |
|  | PVE(Me)-4 | mass % | — | — | — | 30 | — |
|  | PVE(Me)-2 | mass % | — | — | — | — | — |
|  | PVE(Me)-5 | mass % | — | — | — | — | — |
|  | Ester 1 | mass % | — | — | — | — | 100 |
|  | Ester 2 | mass % | — | — | — | — | — |
|  | Mineral Oil 1 | mass % | 70 | 70 | 70 | 70 | — |
|  | Mineral Oil 2 | mass % | — | — | — | — | — |
|  | Ethylene Glycol | mass % | — | — | — | — | — |
|  | Water | mass % | — | — | — | — | — |
| Properties of Lubricating Oil Composition | Kinematic Viscosity, 40° C. | mm$^2$/s | 1.969 | 2.256 | 2.269 | 2.669 | 8.331 |
|  | Kinematic Viscosity, 20° C. | mm$^2$/s | 2.890 | 3.466 | 3.538 | 4.320 | 14.86 |
|  | Density, 20° C. | g/cm$^3$ | 0.8567 | 0.8597 | 0.8635 | 0.8683 | 0.8669 |
|  | Specific Heat, 20° C. | kJ/(kg · K) | 1.69 | 1.69 | 1.68 | 1.69 | 1.87 |
|  | Thermal Conductivity, 20° C. | W/(m · K) | 0.142 | 0.143 | 0.144 | 0.145 | 0.152 |
|  | Relative Heat Transfer Coefficient | — | 1.170 | 1.142 | 1.143 | 1.115 | 0.968 |
|  | Flash Point | ° C. | 102 | 114 | 106 | 115 | 220 |
|  | Pour Point | ° C. | −47.5 | −47.5 | −50 | −50 | −37.5 |
|  | Volume Resistivity, 25° C. | 10$^8$ Ω · m | 170 | 222 | 22000 | 55860 | 40 |

|  |  | unit | Comparative Example 6 | Comparative Example 7 | Comparative Example 8 | Comparative Example 9 |
|---|---|---|---|---|---|---|
| Lubricating Oil Composition | PPG-3 | mass % | — | — | — | — |
|  | PPG-4 | mass % | — | — | — | — |
|  | PPG-5 | mass % | — | — | — | — |
|  | PPG-2 | mass % | — | — | — | — |
|  | PPG-6 | mass % | — | — | — | — |
|  | PVE(Me)-3 | mass % | — | — | — | — |
|  | PVE(Me)-4 | mass % | — | — | — | — |
|  | PVE(Me)-2 | mass % | — | — | — | — |
|  | PVE(Me)-5 | mass % | — | — | — | — |
|  | Ester 1 | mass % | — | — | — | — |
|  | Ester 2 | mass % | 100 | — | — | — |
|  | Mineral Oil 1 | mass % | — | 100 | — | — |
|  | Mineral Oil 2 | mass % | — | — | 100 | — |
|  | Ethylene Glycol | mass % | — | — | — | 50 |
|  | Water | mass % | — | — | — | 50 |
| Properties of Lubricating Oil Composition | Kinematic Viscosity, 40° C. | mm$^2$/s | 10.71 | 2.166 | 4.078 | 2.004 |
|  | Kinematic Viscosity, 20° C. | mm$^2$/s | 20.93 | 3.379 | 7.058 | 3.469 |
|  | Density, 20° C. | g/cm$^3$ | 0.9169 | 0.8334 | 0.8572 | 1.055 |
|  | Specific Heat, 20° C. | kJ/(kg · K) | 1.77 | 1.70 | 1.67 | 2.410 |
|  | Thermal Conductivity, 20° C. | W/(m · K) | 0.152 | 0.140 | 0.141 | 0.244 |
|  | Relative Heat Transfer Coefficient | — | 0.915 | 1.121 | 1.000 | 1.965 |
|  | Flash Point | ° C. | 222 | 101 | 142 | 142 |
|  | Pour Point | ° C. | −48 | −35 | −35 | −30 |
|  | Volume Resistivity, 25° C. | 10$^8$ Ω · m | 0.80 | 1870000 | 44100 | unmeasurable |

From the results in Table 1, the following are known.

As in Examples 1 to 3, it is known that PAG of the general formula (1) where n is 3 to 5 has a high flash point, has a low pour point and is excellent in electrical insulation while having excellent cooling performance.

As opposed to these, it is known that PAG of the general formula (1) where n is 2 has a low flash point and has a low volume resistivity, and is therefore poor in electrical insulation. It is also known that PAG of the general formula (1) where n is 6 has a low relative heat transfer coefficient and is poor in cooling performance.

Also from the results in Table 2, the following are known.

As in Examples 4 and 5, PVE of the general formula (2) where m is 3 to 4 has a high flash point, has a low pour point and is excellent in electrical insulation while having excellent cooling performance.

As opposed to these, it is known that PVE of the general formula (2) where m is 2 has a low flash point. It is also known that PVE of the general formula (2) where n is 5 has a low relative heat transfer coefficient and is poor in cooling performance.

Further from the results in Table 3, the following are known.

From the results in Examples 6 to 9, it is known that the lubricating oil composition containing PAG of the general formula (1) where n is 3 to 4 has a high flash point and PVE of the general formula (2) where m is 3 to 4 has a high flash point, has a low pour point and is excellent in electrical insulation while having excellent cooling performance.

As opposed to these, it is known that when a specific ester oil alone is used (Comparative Examples 5 and 6), when a mineral oil alone is used (Comparative Examples 7 and 8), and when a mixture of ethylene glycol and water is used (Comparative Example 9), at least any one of the relative heat transfer coefficient, the pour point and the volume resistivity thereof does not satisfy the above-mentioned acceptability criteria.

The invention claimed is:

1. A method of cooling an electric vehicle device, the method comprising:
   contacting a lubricating oil composition with the electric vehicle device, thereby cooling the electric vehicle device,
   wherein the lubricating oil composition comprises a base oil (A), the base oil (A) comprising up to 70% by mass mineral oil and in a range of from 30 to 100% by mass:
   (A1) a polyalkylene glycol having a structural unit of formula (1):

(1)

$R^1$ and $R^2$ each being independently H or a monovalent hydrocarbon group having 1 to 18 carbon atoms, $R^3$ being a methyl group, and n being an integer in a range of from 3 to 5; and/or
   (A2) a polyvinyl ether having a structural unit of formula (2)

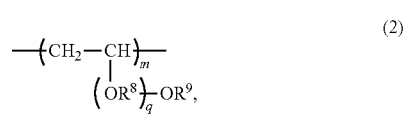

(2)

$R^8$ being a divalent hydrocarbon group having 2 to 10 carbon atoms, $R^9$ being a methyl group, m being 3 or 4, and q being 0.

2. A cooling system configured for an cooling electric vehicle device, the system comprising a lubricating oil composition,
   wherein the lubricating oil composition comprises a base oil (A), the base oil (A) comprising up to 70% by mass mineral oil and in a range of from 30 to 100% by mass:
   (A1) a polyalkylene glycol having a structural unit of formula (1):

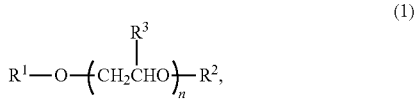

(1)

$R^1$ and $R^2$ each being independently H or a monovalent hydrocarbon group having 1 to 18 carbon atoms, $R^3$ being a methyl group, and n being an integer in a range of from 3 to 5; and/or
   (A2) a polyvinyl ether having a structural unit of formula (2)

(2)

$R^8$ being a divalent hydrocarbon group having 2 to 10 carbon atoms, $R^9$ being a methyl group, m being 3 or 4, and q being 0.

3. The method of claim 1, comprising the polyalkylene glycol (A1).

4. The method of claim 1, comprising the polyvinyl ether (A2).

5. The method of claim 1, wherein the lubricating oil composition has:
   a relative heat transfer coefficient is 1.01 or more, and
   a relative heat transfer coefficient is a heat transfer coefficient relative to the heat transfer coefficient at 20° C., referred to as 1.00, of a mineral oil (α) satisfying (α1) to (α4):
   (α1) kinematic viscosity at 20° C. is 7.06 mm²/s,
   (α2) specific heat at 20° C. is 1.67 KJ/(kg·K),
   (α3) density at 20° C. is 0.857 g/cm³,
   (α4) thermal conductivity at 20° C. is 0.141 W/(m·K).

6. The method of claim 1, wherein the lubricating oil composition has a volume resistivity at 25° C. is $1.00 \times 10^8$ Ω·m or more.

7. The method of claim 1, wherein the lubricating oil composition has a flash point is 100° C. or higher.

8. The method of claim 1, wherein the lubricating oil composition has a pour point is −40° C. or lower.

9. The method of claim 1, wherein the electric vehicle device is a motor, generator, capacitor, converter, inverter, engine, or transmission.

10. The system of claim 2, comprising the polyalkylene glycol (A1).

11. The system of claim 2, comprising the polyvinyl ether (A2).

12. The system of claim 2, wherein the lubricating oil composition has:
    a relative heat transfer coefficient is 1.01 or more, and
    a relative heat transfer coefficient is a heat transfer coefficient relative to the heat transfer coefficient at 20° C., referred to as 1.00, of a mineral oil (α) satisfying (α1) to (α4):
    (α1) kinematic viscosity at 20° C. is 7.06 mm²/s,
    (α2) specific heat at 20° C. is 1.67 KJ/(kg·K),
    (α3) density at 20° C. is 0.857 g/cm³,
    (α4) thermal conductivity at 20° C. is 0.141 W/(m·K).

13. The system of claim 2, wherein the lubricating oil composition has a volume resistivity at 25° C. is $1.00 \times 10^8$ Ω·m or more.

14. The system of claim 2, wherein the lubricating oil composition has a flash point is 100° C. or higher.

15. The system of claim 2, wherein the lubricating oil composition has a pour point is −40° C. or lower.

16. The system of claim 2, wherein the electric vehicle device is a motor, generator, capacitor, converter, inverter, engine, or transmission.

17. The method of claim 1, wherein the base oil (A) consists of at least one of the polyalkylene glycol (A1) and/or at least one of the polyvinyl ether (A2), and optionally VG2 mineral oil, and
    wherein the lubricating oil composition uses no more than 20% by mass additives, based on total the lubricating oil composition weight.

18. The system of claim 2, wherein the base oil (A) consists of at least one of the polyalkylene glycol (A1) and/or at least one of the polyvinyl ether (A2), and optionally VG2 mineral oil, and
    wherein the lubricating oil composition uses no more than 20% by mass additives, based on total the lubricating oil composition weight.

19. The method of claim 1, wherein, in the formula (1), $R^1$ and $R^2$ are independently H or a monovalent hydrocarbon group having 1 to 6 carbon atoms.

20. The system of claim 2, wherein, in the formula (1), $R^1$ and $R^2$ are independently H or a monovalent hydrocarbon group having 1 to 6 carbon atoms.

* * * * *